US011617950B2

(12) United States Patent
Kmita et al.

(10) Patent No.: US 11,617,950 B2
(45) Date of Patent: Apr. 4, 2023

(54) GRAPHICAL INDICATOR FOR VIDEO GAMES

(71) Applicant: SQUARE ENIX LTD., London (GB)

(72) Inventors: Bartosz Kmita, Warsaw (PL); Piotr Nowakowski, Warsaw (PL)

(73) Assignee: Square Enix Ltd., London (GB)

( * ) Notice: Subject to any disclaimer, the term of this patent is extended or adjusted under 35 U.S.C. 154(b) by 8 days.

(21) Appl. No.: 17/056,664

(22) PCT Filed: Jan. 27, 2020

(86) PCT No.: PCT/GB2020/050178
§ 371 (c)(1),
(2) Date: Nov. 18, 2020

(87) PCT Pub. No.: WO2021/152278
PCT Pub. Date: Aug. 5, 2021

(65) Prior Publication Data
US 2022/0047947 A1 Feb. 17, 2022

(51) Int. Cl.
*A63F 13/537* (2014.01)
*A63F 13/837* (2014.01)

(52) U.S. Cl.
CPC .......... *A63F 13/537* (2014.09); *A63F 13/837* (2014.09)

(58) Field of Classification Search
CPC .............................. A63F 13/537; A63F 13/837
See application file for complete search history.

(56) References Cited

U.S. PATENT DOCUMENTS 8,210,943 B1 * 7/2012 Woodard ................ A63F 13/69
463/2
9,033,797 B1 * 5/2015 Karpiuk .................. A63F 13/90
463/31
(Continued)

FOREIGN PATENT DOCUMENTS

CN 110548288 A 12/2019
EP 0844580 A2 5/1998
(Continued)

OTHER PUBLICATIONS

Update 9.17.1: New and Improved Battle Indicators. Worldoftanks. eu. Online. Feb. 3, 2017. Accessed via the Internet. Accessed Feb. 17, 2022. <URL: https://worldoftanks.eu/en/news/general-news/update-917-1-damage-log/> (Year: 2017).*
(Continued)

*Primary Examiner* — Thomas J Hong
*Assistant Examiner* — Carl V Larsen
(74) *Attorney, Agent, or Firm* — Fenwick & West LLP

(57) ABSTRACT

A video game that is progressed by controlling a character operated by a player in a virtual game world in which the character is vulnerable to attack. A computer apparatus functions as: an attack analysing unit configured to determine a direction of an incoming attack, and an intensity of the incoming attack or a level of damage inflicted upon the character as a consequence of the incoming attack; and a graphical indicator generating unit configured to generate an on-screen graphical indicator comprising: a first pointing part arranged to indicate the determined direction of the incoming attack, and a second part arranged to indicate the determined intensity of the incoming attack or the determined level of damage inflicted upon the character as a consequence of the incoming attack; wherein the first point-
(Continued)

ing part and the second part are joined together to form the graphical indicator.

18 Claims, 13 Drawing Sheets

(56) References Cited

U.S. PATENT DOCUMENTS

2010/0267451 A1* 10/2010 Kawano ............... A63F 13/005
                                                        463/43
2015/0258442 A1*  9/2015 Yudo .................... A63F 13/537
                                                        463/31

FOREIGN PATENT DOCUMENTS

| JP | 2010075353 A | 4/2010 |
|----|--------------|--------|
| JP | 2010-207404 A | 9/2010 |
| JP | 2011-212123 A | 10/2011 |
| JP | 2012-166068 A | 9/2012 |
| JP | 2014233366 A | 12/2014 |
| JP | 2016126511 A | 7/2016 |
| JP | 2016220847 A | 12/2016 |

OTHER PUBLICATIONS

Version 9.16: New Features. World of Tanks.eu. Online. Sep. 29, 2016. Accessed via the Internet. Accessed Feb. 17, 2022. <URL: https://worldoftanks.eu/en/news/general-news/ver-916-features-summary/> (Year: 2016).*

Warface—3 Tips to Become a Pro. Youtube.com. Online. Oct. 25, 2017. Accessed via the Internet. Accessed Feb. 17, 2022. <URL: https://www.youtube.com/watch?v=ozMcRbLYbUk> (Year: 2017).*

Warface Review. Pcgamer.com. Online. Aug. 27, 2014. Accessed via the Internet. Accessed Feb. 17, 2022. <URL: https://www.pcgamer.com/warface-review/> (Year: 2014).*

Grenades damage animation:#cod #infinitewarfare #shorts. Youtube.com. Online. Accessed via the Internet. Accessed Dec. 1, 2022. <URL: https://www.youtube.com/shorts/wbZ1xvXTI9k> (Year: 2022).*

Call of Duty: Infinite Warfare. Wikipedia.org. Online. Accessed via the Internet. Accessed Dec. 1, 2022. <URL: https://en.wikipedia.org/wiki/Call_of_Duty:_Infinite_Warfare> (Year: 2022).*

PCT International Search Report and Written Opinion, PCT Application No. PCT/GB2020/050178, dated Oct. 8, 2020, 10 pages.

The Japan Patent Office, Office Action, Japanese Patent Application No. 2021-506325, dated Sep. 16, 2022, seven pages.

* cited by examiner

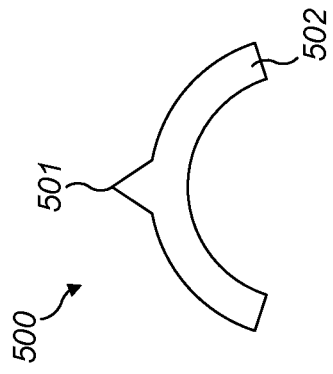
FIG. 8a
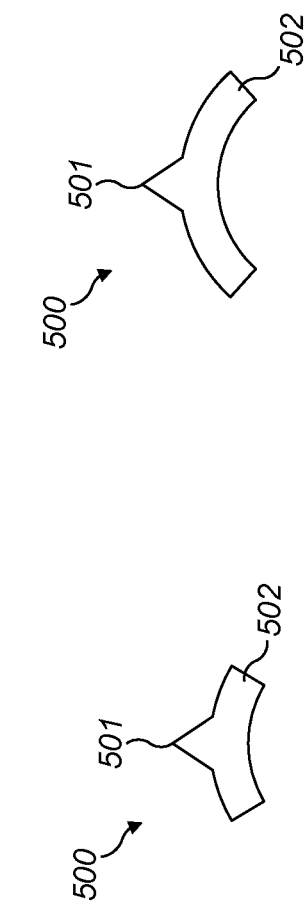
FIG. 8b
FIG. 8c
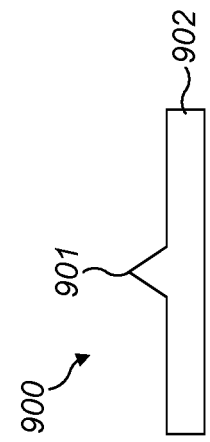
FIG. 9a
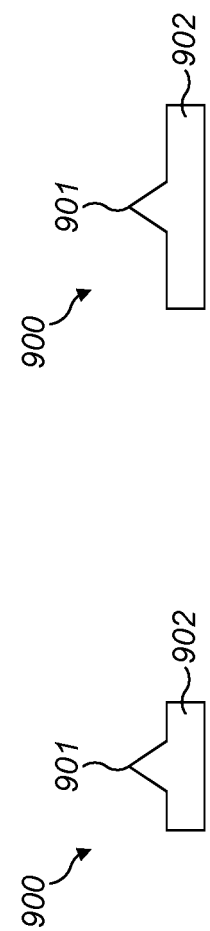
FIG. 9b
FIG. 9c

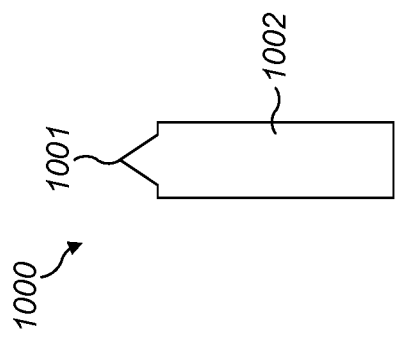
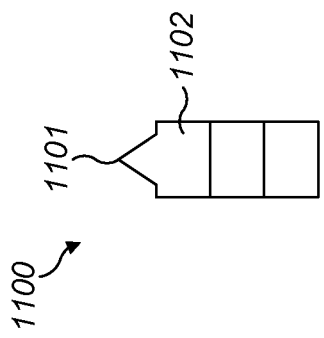
FIG. 10c
FIG. 11c
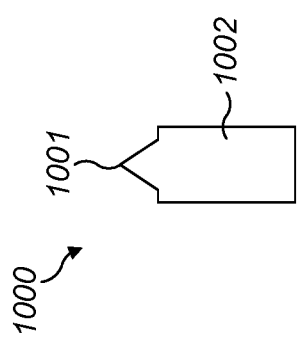
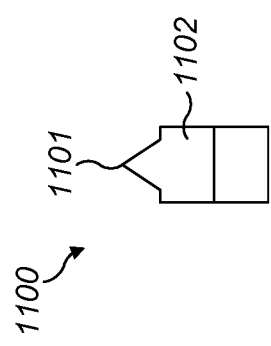
FIG. 10b
FIG. 11b
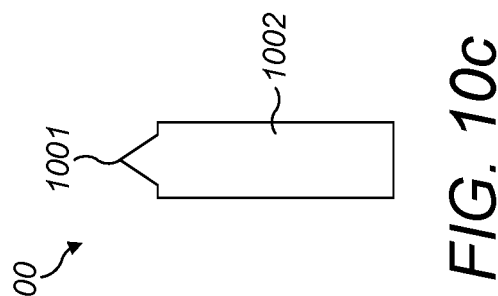
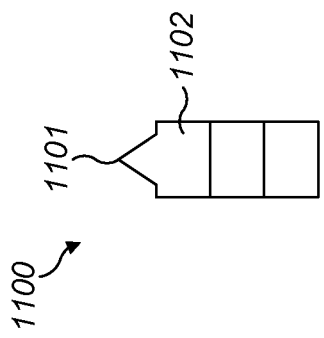
FIG. 10a
FIG. 11a

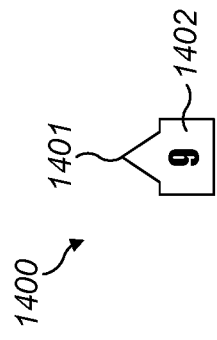
FIG. 14c
FIG. 14b
FIG. 14a
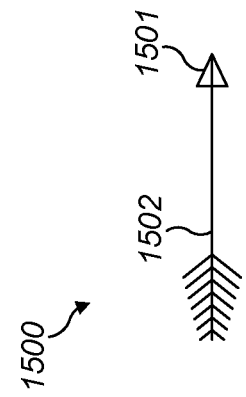
FIG. 15c
FIG. 15b
FIG. 15a

GRAPHICAL INDICATOR FOR VIDEO GAMES

FIELD OF THE INVENTION

The present invention relates to video games, and more particularly to an on-screen graphical indicator that may be included within a video game.

BACKGROUND TO THE INVENTION

In many video games (both single-player and multiplayer video games), a player character (i.e. the character within the game that is controlled by the user) may be attacked by one or more enemy characters. For instance, in a so-called "first-person shooter" game, in which the player character carries a gun and the screen depicts a three-dimensional view of the game world as though through the eyes of the player character, the player character may come under attack from enemy gunmen. In such a game, it is known to provide the user with an on-screen graphical indicator to show the direction from which enemy gunfire is coming.

However, traditionally, such an indicator can at times be hard for the user to interpret, for example during a fast-paced game. Moreover, aside from showing the direction from which an attack is coming, such an indicator may not provide the user with a readily-comprehensible indication of the actual threat that the attack represents to the player character's life.

A further problem is that such an indicator can take up valuable space on the user's display screen, potentially obscuring other aspects of game content. This can be a particular issue with games that are played on mobile devices (such as smartphones or tablet devices) that have relatively small screens.

Accordingly, in video games in which the player character is susceptible to attack, there is a desire to provide the user with more meaningful information about an incoming attack, in addition to the direction from which the attack is coming, in a compact manner that is quick and easy to comprehend.

It should be noted that the term "user" as used herein may be used interchangeably with the term "player", and the two terms should be treated as synonymous.

SUMMARY OF THE INVENTION

According to a first aspect of the invention there is provided a computer-readable recording medium including a program which is executed by a computer apparatus to provide a video game that is progressed by controlling a character operated by a player in a virtual game world in which the character is vulnerable to attack, the program causing the computer apparatus to function as: an attack analysing unit configured to determine a direction of an incoming attack, and an intensity of the incoming attack or a level of damage inflicted upon the character as a consequence of the incoming attack; and a graphical indicator generating unit configured to generate an on-screen graphical indicator comprising: a first pointing part arranged to indicate the determined direction of the incoming attack, and a second part arranged to indicate the determined intensity of the incoming attack or the determined level of damage inflicted upon the character as a consequence of the incoming attack; wherein the first pointing part and the second part are joined together to form the graphical indicator.

By analysing the attack (e.g. incoming gunfire) and generating such a graphical indicator, the user is advantageously informed of the direction and intensity of the incoming attack, or the level of damage inflicted upon the character as a consequence of the incoming attack, by means of a single readily-comprehensible graphical indicator. More particularly, the direction of the attack is straightforwardly indicated by the first pointing part, whilst the intensity of the attack or the level of damage inflicted upon the character as a consequence of the attack is simultaneously indicated by the second part.

By virtue of the first and second parts being joined together to form a single graphical indicator, the user can quickly and easily comprehend the information that is being conveyed, as the information is conveyed in one place on the display screen. Moreover, by virtue of the first and second parts forming a single graphical indicator, the indicator can be made compact, so as to take up minimal space on the display screen and reduce the likelihood of obscuring other aspects of game content.

Preferably, the first pointing part comprises an arrowhead, as such a shape is readily comprehensible as indicating a direction. However, in alternative implementations the first pointing part may take some other direction-indicating shape, such as a line or a needle.

Preferably, the graphical indicator generating unit is configured to adjustably set an angular position of the first pointing part relative to a reference position which corresponds to a straight-ahead direction of the character, the angular position of the first pointing part corresponding to the direction of the incoming attack relative to the straight-ahead direction of the character.

Optionally, the second part comprises a geometric shape. According to presently-preferred embodiments, the second part comprises an arc. More particularly, the graphical indicator generating unit may be configured to adjustably set the length of the arc in dependence on the determined intensity of the incoming attack or the determined level of damage inflicted upon the character as a consequence of the incoming attack.

Preferably, the first pointing part is arranged in the midpoint of the arc. Accordingly, the extent to which the arc extends (symmetrically) on either side of the pointing part denotes the intensity of the incoming attack or the level of damage inflicted upon the character as a consequence of the incoming attack.

Geometrically, the arc may be an arc of a virtual circle, and the graphical indicator generating unit may be configured to adjustably set the angular position of the first pointing part on the circumference of the virtual circle. Alternatively, though, the arc may be an arc of another curved virtual shape, such a virtual ellipse.

More generally, the graphical indicator generating unit may be configured to adjustably set the size or length of the second part in dependence on the determined intensity of the incoming attack or the determined level of damage inflicted upon the character as a consequence of the incoming attack.

Optionally, the second part may be elongate, and the graphical indicator generating unit may be configured to adjustably set the length of the second part in dependence on the determined intensity of the incoming attack or the determined level of damage inflicted upon the character as a consequence of the incoming attack.

In certain embodiments, the graphical indicator generating unit may be configured to arrange the second part substantially perpendicularly to the pointing direction of the first pointing part. Alternatively, the graphical indicator generating unit may be configured to arrange the second part substantially parallel to the pointing direction of the first pointing part.

In other embodiments, the graphical indicator generating unit may be configured to adjustably set a density of shading of the second part in dependence on the determined intensity of the incoming attack or the determined level of damage inflicted upon the character as a consequence of the incoming attack.

In other embodiments, the graphical indicator generating unit may be configured to adjustably set an extent of shading or fill of the second part in dependence on the determined intensity of the incoming attack or the determined level of damage inflicted upon the character as a consequence of the incoming attack.

In other embodiments, the graphical indicator generating unit may be configured to adjustably seta colour of the second part in dependence on the determined intensity of the incoming attack or the determined level of damage inflicted upon the character as a consequence of the incoming attack.

In other embodiments, the second part may comprise a numerical indicator, and the graphical indicator generating unit may be configured to adjustably set a numerical value of the numerical indicator in dependence on the determined intensity of the incoming attack or the determined level of damage inflicted upon the character as a consequence of the incoming attack.

In yet other embodiments, the second part may comprise a graphical image, and the graphical indicator generating unit may be configured to adjustably set an extent of completeness of the graphical image in dependence on the determined intensity of the incoming attack or the determined level of damage inflicted upon the character as a consequence of the incoming attack.

Optionally, the direction of the incoming attack may be a direction of impact of the attack on the character (and not necessarily the direction of the enemy character itself). Such a configuration may be particularly useful if the character is under fire from projectiles such as arrows or stones that do not follow a linear trajectory, as it may enable the user to take a defensive measure (such as bringing up a shield) in an appropriate direction to block the projectile, or moving the character in a suitable direction to evade the projectile.

In certain embodiments, the attack analysing unit may be configured to determine an instantaneous intensity of the incoming attack.

Alternatively, the attack analysing unit may be configured to determine the level of damage the attack is capable of causing the character, or the instantaneous level of damage being absorbed by the character, or the total level of damage absorbed by the character over a period of gameplay (e.g. since the attack or battle began, or since the beginning of the game).

With presently-preferred embodiments the video game is a first-person shooter game. However, it may alternatively be a third-person shooter game, for example.

BRIEF DESCRIPTION OF THE DRAWINGS

Embodiments of the invention will now be described, by way of example only, and with reference to the drawings in which:

FIGS. 8a, 8b and 8c depict the graphical indicator according to the first embodiment, the indicator indicating, respectively, a low intensity of an incoming attack (FIG. 8a), a medium intensity of an incoming attack (FIG. 8b), and a high intensity of an incoming attack (FIG. 8c), as well as the direction of the incoming attack;

FIGS. 9a, 9b and 9c depict a graphical indicator according to a second embodiment, the indicator indicating, respectively, a low intensity of an incoming attack (FIG. 9a), a medium intensity of an incoming attack (FIG. 9b), and a high intensity of an incoming attack (FIG. 9c), as well as the direction of the incoming attack;

FIGS. 10a, 10b and 10c depict a graphical indicator according to a third embodiment, the indicator indicating, respectively, a low intensity of an incoming attack (FIG. 10a), a medium intensity of an incoming attack (FIG. 10b), and a high intensity of an incoming attack (FIG. 10c), as well as the direction of the incoming attack;

FIGS. 11a, 11b and 11c depict a graphical indicator according to a fourth embodiment, the indicator indicating, respectively, a low intensity of an incoming attack (FIG. 11a), a medium intensity of an incoming attack (FIG. 11b), and a high intensity of an incoming attack (FIG. 11c), as well as the direction of the incoming attack;

FIGS. 14a, 14b and 14c depict a graphical indicator according to a seventh embodiment, the indicator indicating, respectively, a low intensity of an incoming attack (FIG.

Figure 5:
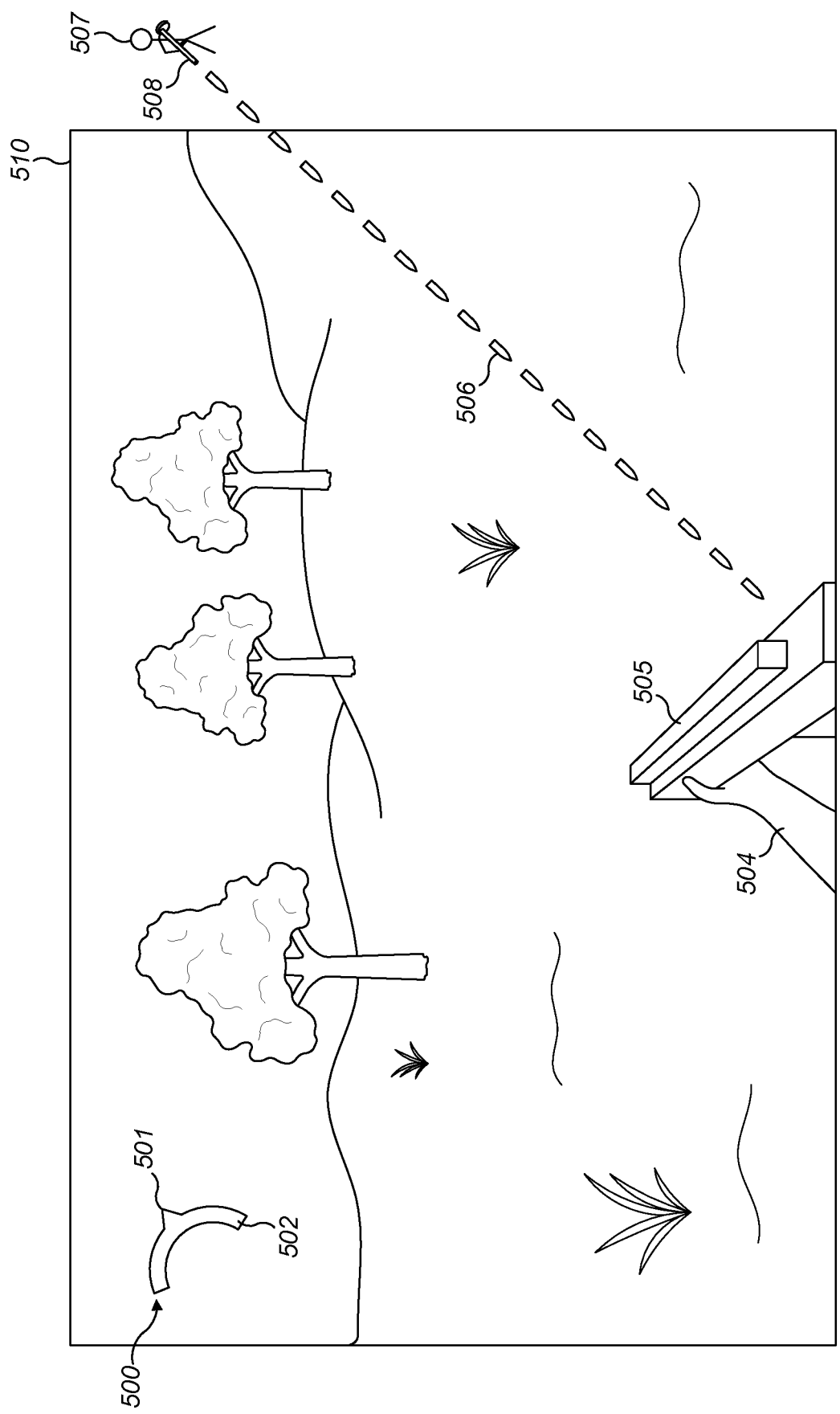
FIG. 5 schematically depicts a screenshot, from a "first person" perspective, of a player character receiving an incoming attack of a relatively high intensity from an enemy character positioned off-screen, in front and to the right of the player character, and including a graphical indicator in accordance with a first embodiment of the invention, indicating both the direction and the intensity of incoming gunfire.
Figure 16:
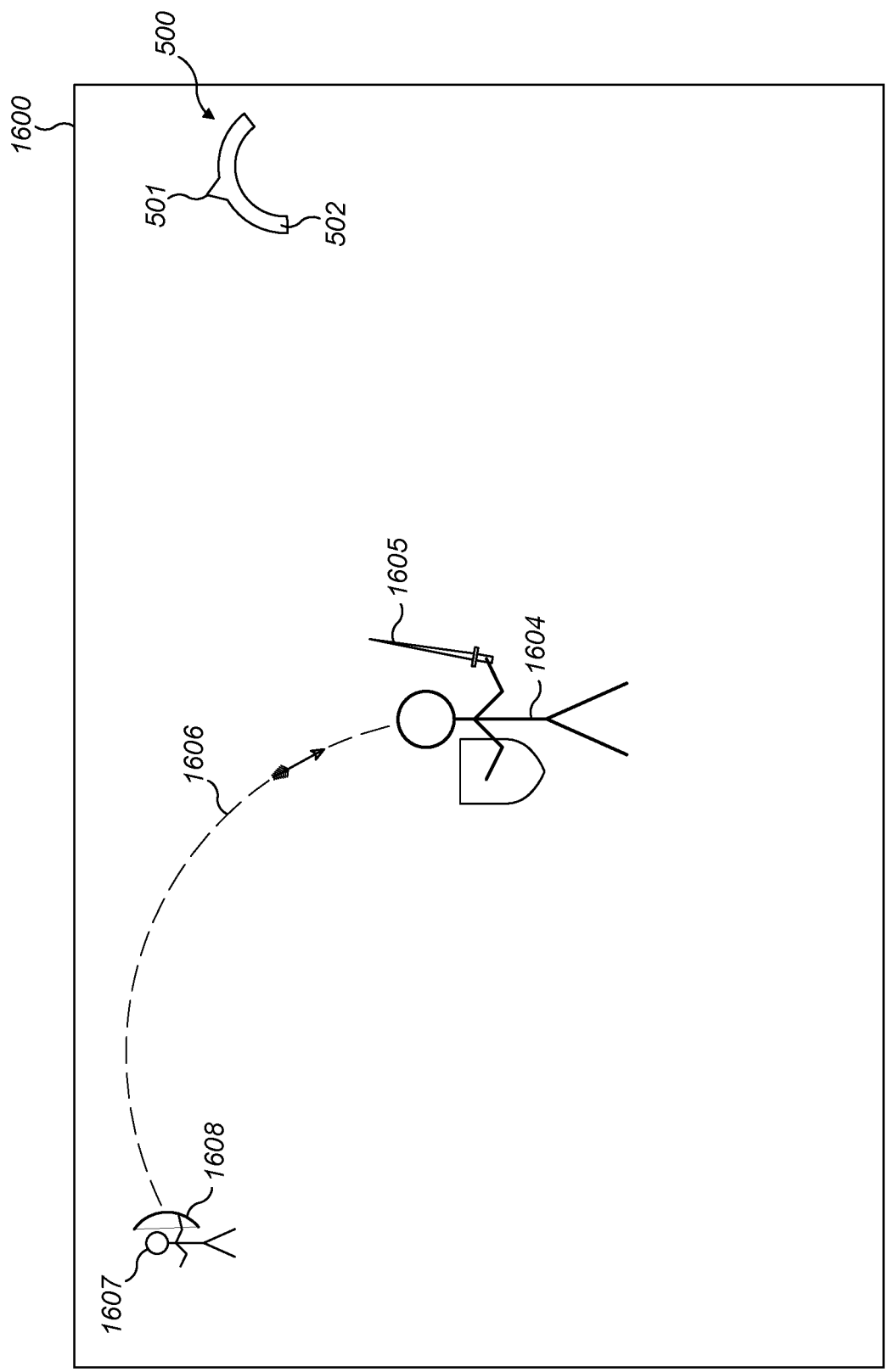
Figure 17:
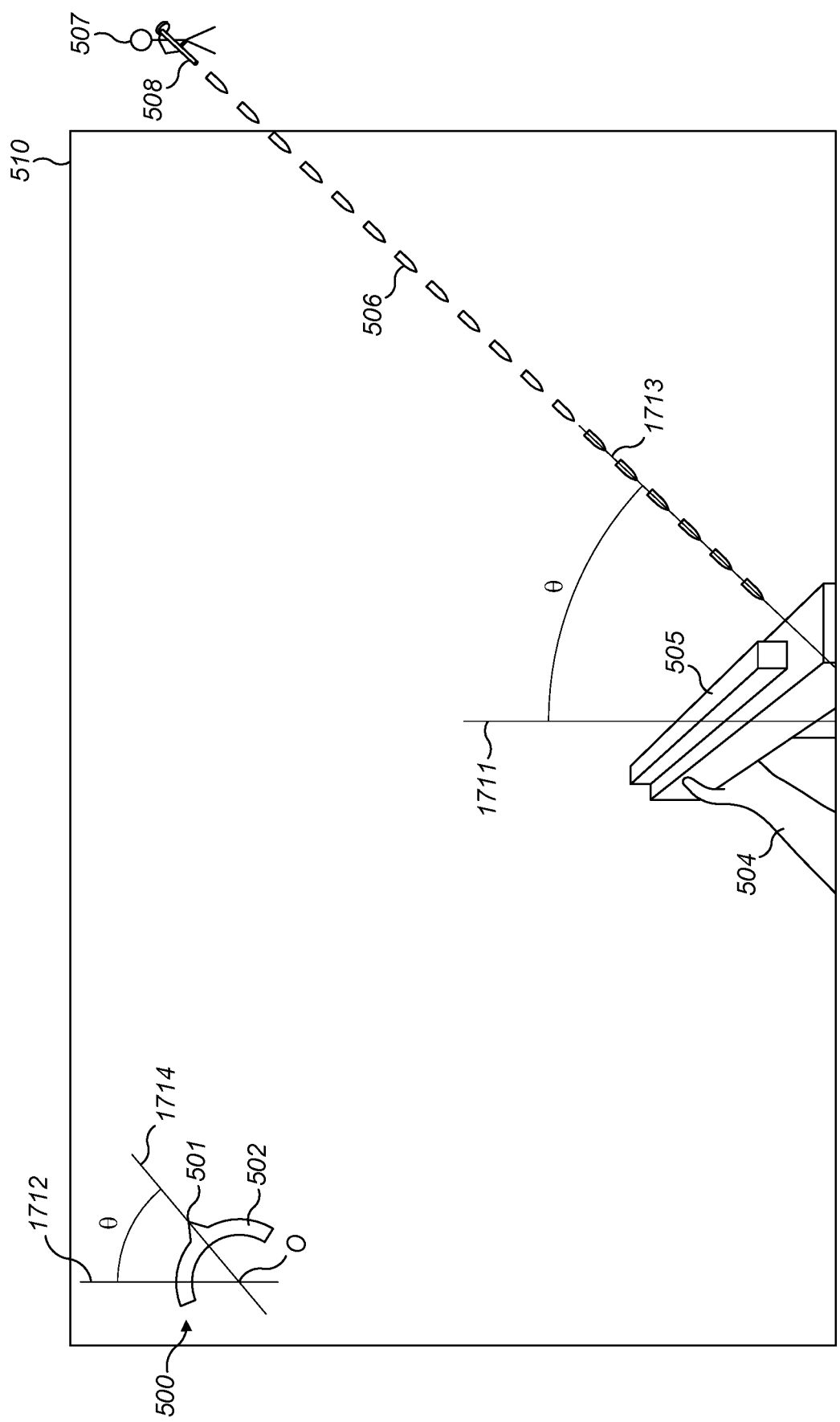
Figure 18:
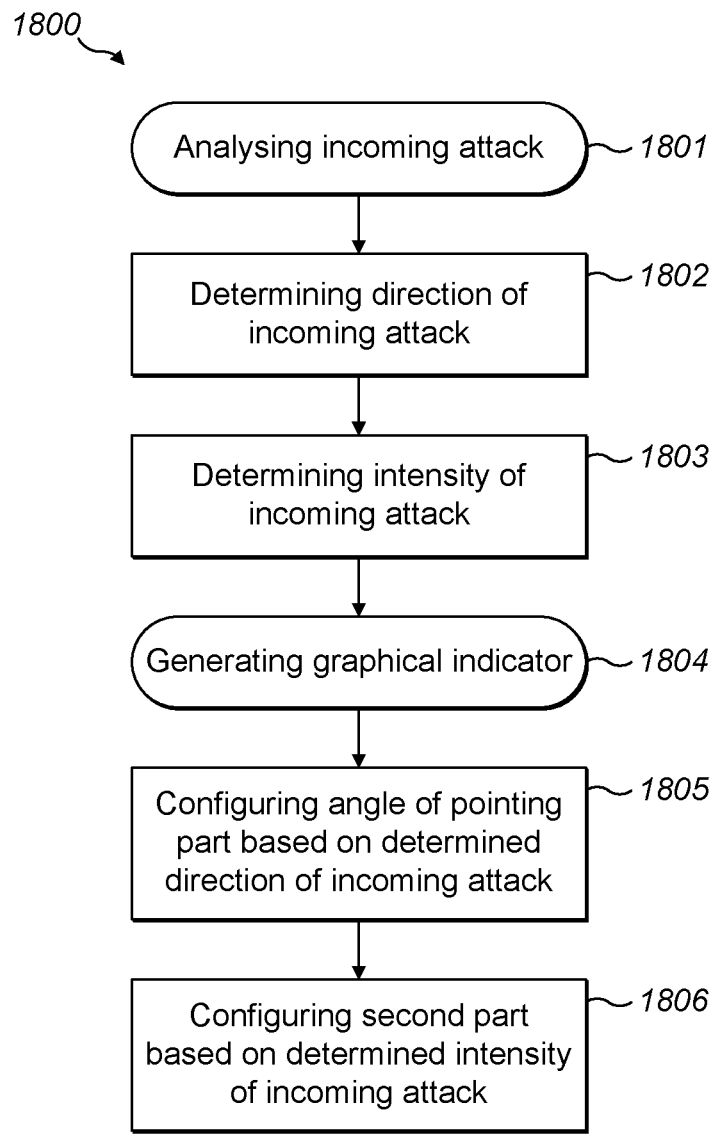

14a), a medium intensity of an incoming attack (FIG. 14b), and a high intensity of an incoming attack (FIG. 14c), as well as the direction of the incoming attack;

FIGS. 15a, 15b and 15c depict a graphical indicator according to an eighth embodiment, the indicator indicating, respectively, a low intensity of an incoming attack (FIG. 15a), a medium intensity of an incoming attack (FIG. 15b), and a high intensity of an incoming attack (FIG. 15c), as well as the direction of the incoming attack;

FIG. 16 schematically depicts a screenshot, from a "third person" perspective, of a player character receiving an incoming attack from an enemy character positioned in front and to the left of the player character, and including the graphical indicator in accordance with the first embodiment, to illustrate a situation in which the direction indicated by the graphical indicator is the direction of impact of the attack on the player character;

FIG. 17 is an annotated and simplified version of the schematic screenshot of FIG. 5, to illustrate geometrical aspects of the graphical indicator; and FIG. 18 is a procedural flow diagram of an attack analysing and graphical indicator generating routine according to embodiments of the invention.

DETAILED DESCRIPTION OF PREFERRED EMBODIMENTS

The present embodiments represent the best ways known to the Applicant of putting the invention into practice. However, they are not the only ways in which this can be achieved.

Embodiments of the present invention provide an on-screen graphical indicator that is incorporated within a video game. The video game is provided as a computer program. The computer program may be supplied on a computer-readable medium (e.g. a non-transitory computer-readable recording medium such as a CD or DVD) having computer-readable instructions thereon. Alternatively the computer program may be provided in a downloadable format, over a network such as the Internet, or may be hosted on a server.

Figure 1:
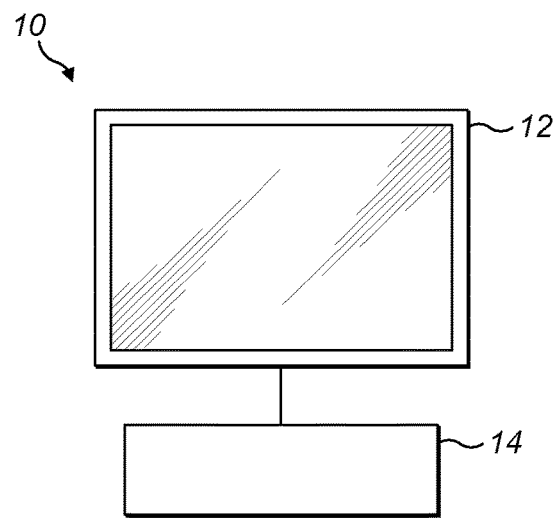
FIG. 1 schematically illustrates a video game apparatus (for example a personal computer or a video game console) on which a video game which incorporates an embodiment of the present invention may be played.

With reference to FIG. 1, the video game program may be executed on a video game apparatus 10, such as a personal computer or a video game console. The video game apparatus 10 comprises a display screen 12 on which the video game is displayed, and a control unit 14 which typically includes at least a Central Processing Unit (CPU), a Read Only Memory (ROM) and a Random Access Memory (RAM). The control unit 14 may also include a Graphics Processing Unit (GPU) and a sound processing unit. The display screen 12 and the control unit 14 may be provided in a common housing, or may be separate connected units. The video game apparatus 10 also includes one or more user input devices by which the user can control a player character in the game. Such a user input device may comprise, for example, a mouse, a keyboard, a hand-held controller (e.g. incorporating a joystick and/or various control buttons), or a touchscreen interface integral with the display screen 12 (e.g. as in the case of a smartphone or a tablet computer). The video game apparatus 10 may be connected to a network such as the Internet, or may be stand-alone apparatus that is not connected to a network.

Figure 2:
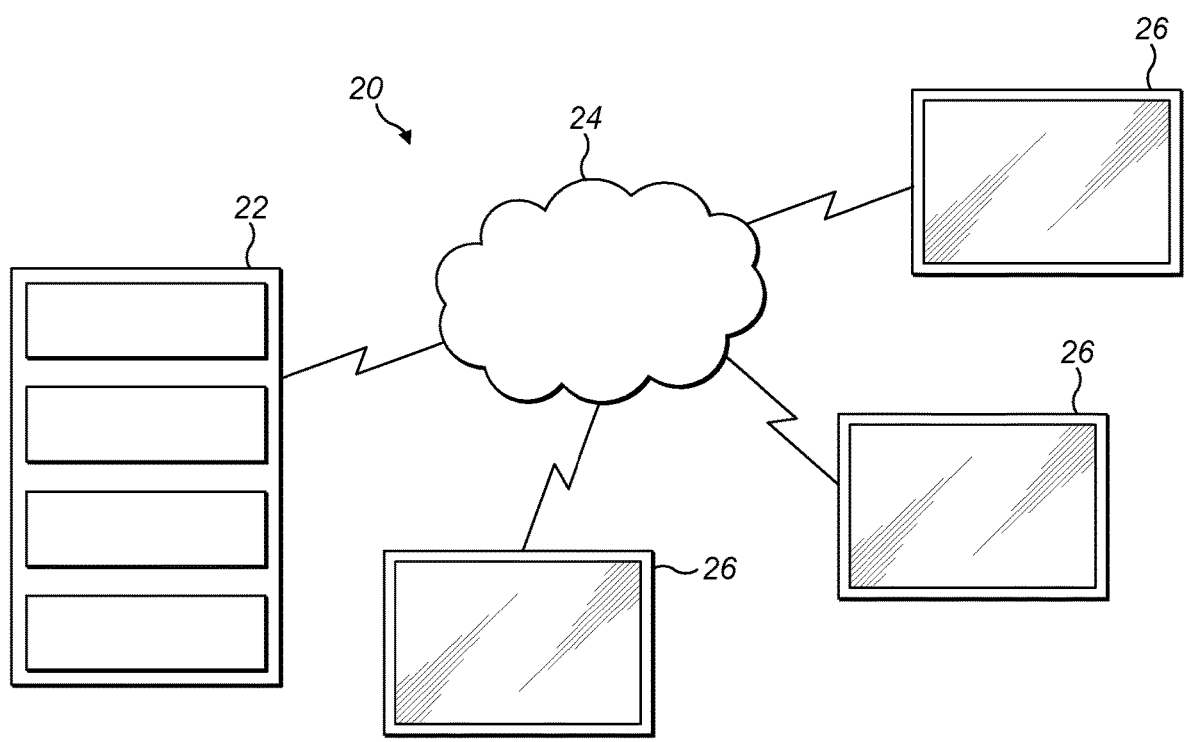
FIG. 2 schematically illustrates a network-based video game system comprising a server and a plurality of client terminals, on which terminals a video game which incorporates an embodiment of the present invention may be played.

Alternatively, with reference to FIG. 2, the video game program may be executed within a network-based video game system 20. The video game system 20 comprises a server device 22, a communication network 24 (e.g. the Internet), and a plurality of user terminals 26 operated by respective users. The server device 22 communicates with the user terminals 26 through the communication network 24. Each user terminal 26 may comprise a network-connectable video game apparatus 10 as described above, such as a personal computer or a video game console, or a smartphone, a tablet computer, or some other suitable piece of user equipment. The video game program may be executed on the server 22, which may stream user-specific game content (e.g. video in real time) to each of the plurality of user terminals 26. At each user terminal the respective user can interact with the game and provide input that is transmitted to the server 22, to control the progress of the game for the user. Alternatively, for a given user, the video game program may be executed within the respective user terminal 26, which may interact with the server 22 when necessary.

In either case, the video game progresses in response to user input, with the user input controlling a player character. The user's display screen may display the player character's field of view in the game world in a "first-person" manner, preferably in three dimensions, and preferably using animated video rendering (e.g. photorealistic video rendering in particular), in the manner of a virtual camera.

Alternatively, the user's display screen may display the player character and other objects or characters in the game world in a "third-person" manner, again preferably in three dimensions, and preferably using animated video rendering (e.g. photorealistic video rendering in particular), in the manner of a virtual camera.

Figure 3:
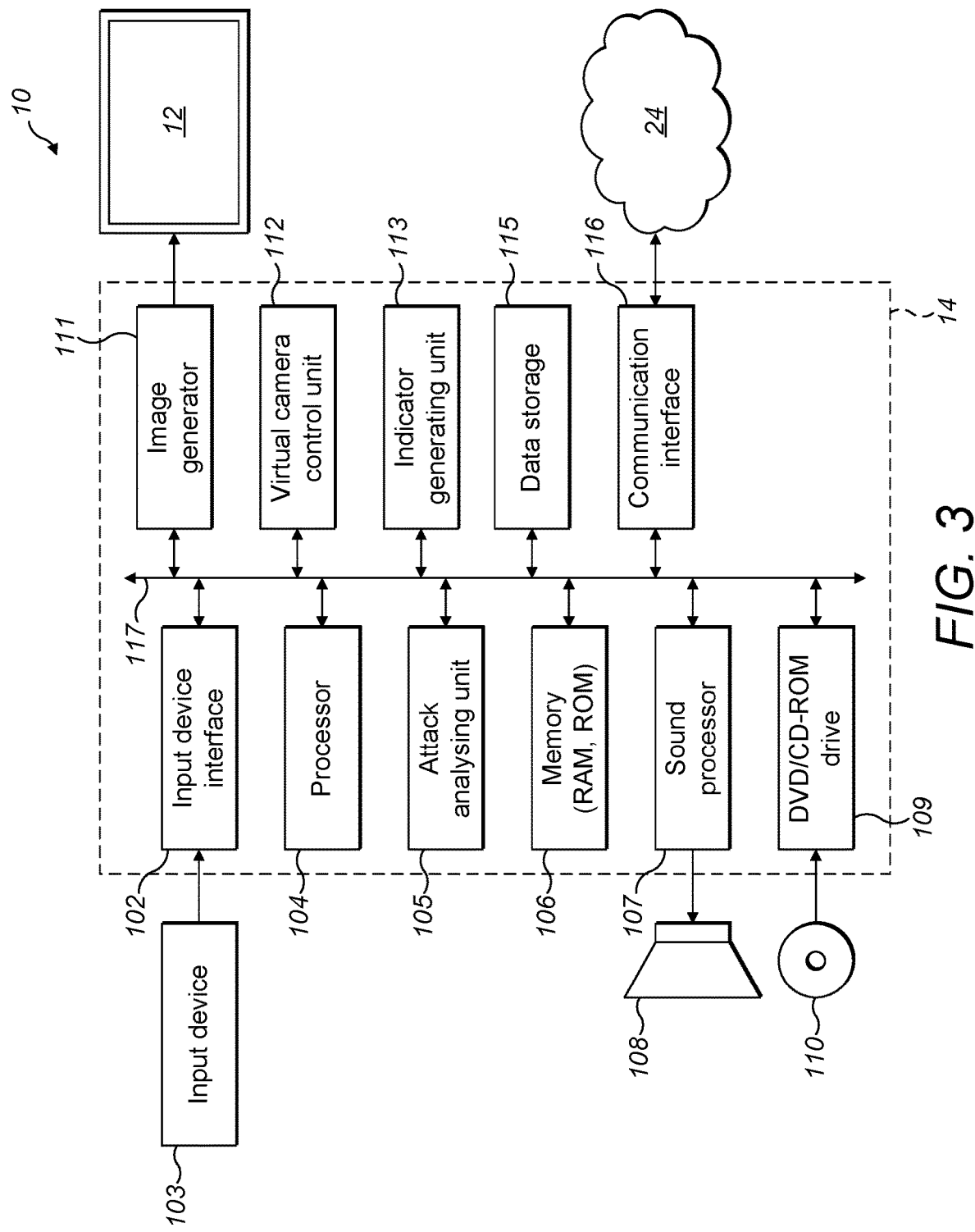
FIG. 3 is a block diagram showing the configuration of a video game apparatus as shown in FIG. 1.

FIG. 3 is a block diagram showing the configuration of the video game apparatus 10 shown in FIG. 1, in the case of the game being executed on such apparatus. It will be appreciated that the contents of the block diagram are not exhaustive, and that other components may also be present.

As illustrated, the control unit 14 of the video game apparatus 10 includes an input device interface 102 to which an input device 103 (e.g. a mouse, a keyboard or a hand-held controller, e.g. incorporating a joystick and/or various control buttons, as mentioned above) is connected, a processor (e.g. CPU) 104, and an image generator (e.g. GPU) 111 to which a display unit 12 is connected.

The control unit 14 also includes memory (e.g. RAM and ROM) 106, a sound processor 107 connectable to a sound output device 108, a DVD/CD-ROM drive 109 operable to receive and read a DVD or CD-ROM 110 (both being examples of a computer-readable recording medium), a communication interface 116 connectable to the communication network 24 (e.g. the Internet), and data storage means 115 via which data can be stored on a storage device (either within or local to the video game apparatus 10, or in communication with the control unit 14 via the network 24). For a stand-alone (not network connected) video game apparatus, the communication interface 116 may be omitted.

The video game program causes the control unit 14 to take on further functionality of a virtual camera control unit 112, an attack analysing unit 105 and an indicator generating unit 113.

An internal bus 117 connects components 102, 104, 105, 106, 107, 109, 111, 112, 113, 114, 115 and 116 as shown.

Figure 4:
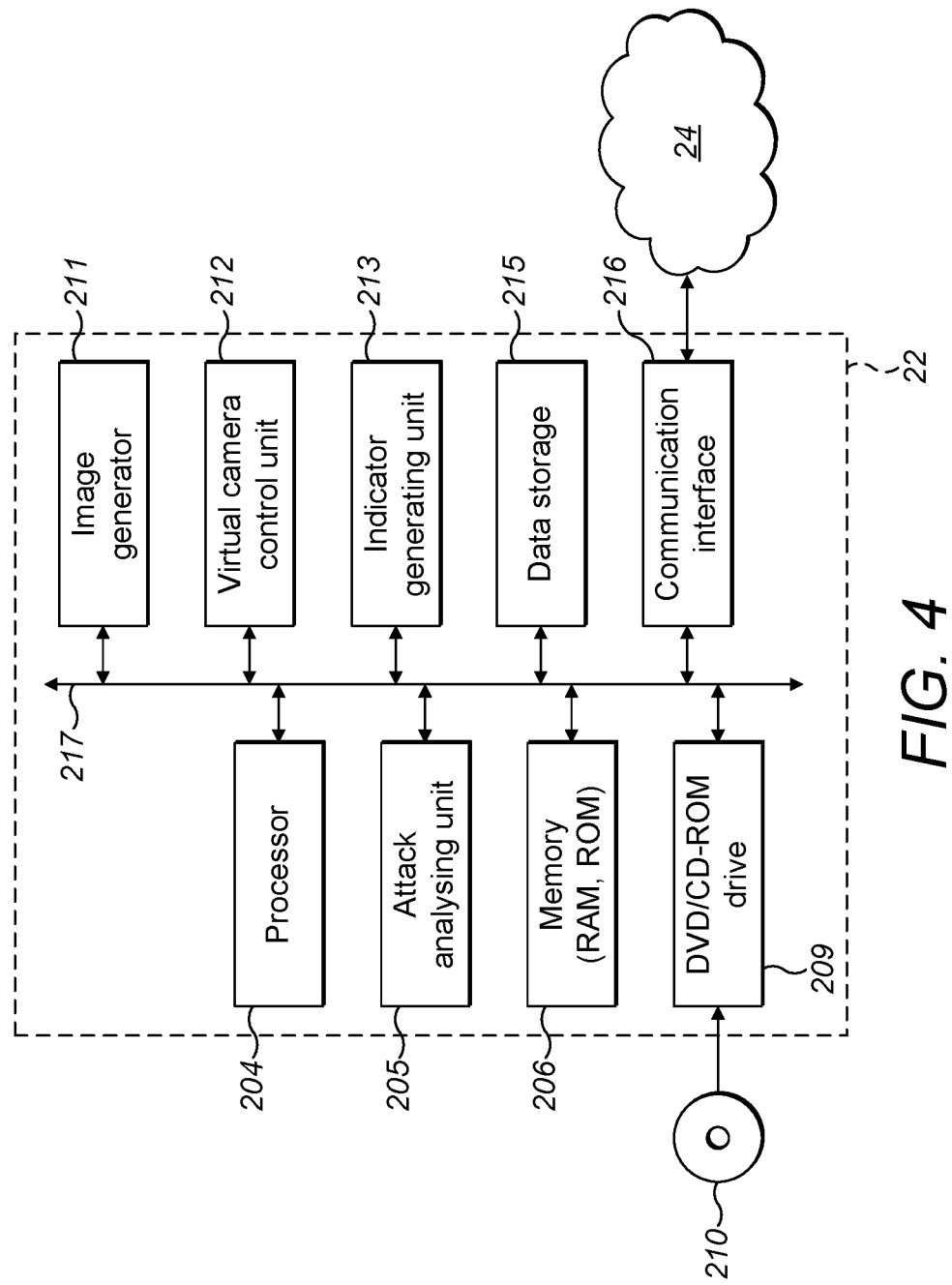
FIG. 4 is a block diagram showing the configuration of a server as shown in FIG. 2.

FIG. 4 is a block diagram showing the configuration of the server apparatus 22 shown in FIG. 2, in the case of the game being executed within a network-based video game system. It will be appreciated that the contents of the block diagram are not exhaustive, and that other components may also be present.

As illustrated, the server apparatus 22 includes a processor (e.g. CPU) 204, and an image generator (e.g. GPU) 211, memory (e.g. RAM and ROM) 206, a DVD/CD-ROM drive 209 operable to receive and read a DVD or CD-ROM 210 (both being examples of a computer-readable recording medium), a communication interface 216 connected to the communication network 24 (e.g. the Internet), and data storage means 215 via which data can be stored on a storage device (either within or local to the server apparatus 22, or in communication with the server apparatus 22 via the network 24).

The video game program causes the server apparatus 22 to take on further functionality of a virtual camera control unit 212, an attack analysing unit 205 and an indicator generating unit 213.

An internal bus 217 connects components 204, 205, 206, 209, 211, 212, 213, 214, 215 and 216 as shown.

Via the communication interface 216 and the network 24, the server apparatus 22 may communicate with a user terminal 26 (e.g. video game apparatus 10) as mentioned above, during the course of the video game. Amongst other things, the server apparatus 22 may receive user input from the input device 103 of the video game apparatus 10, and may cause video output to be displayed on the display screen 12 of the video game apparatus 10.

Attack Analysis and Graphical Indicator Generation

Throughout the course of the video game the player character may be subject to incoming attacks from enemy characters within the game world. Such attacks may come from a number of different directions relative to the direction in which the player character is facing or moving, and may come from an enemy character who is visible to the user (i.e. on-screen) or who is invisible to the user (e.g. off-screen, or concealed behind an object on-screen, or behind the player character). In the present disclosure the incoming attack is generally exemplified as being gunfire (i.e. bullets). However, depending on the subject of the video game, a different form of attack may take place, such as projectile attack (e.g. arrows launched by archers, in the case of a game set in a medieval period).

To improve a player's awareness of the threat that an incoming attack represents to the player character's life, and to enable them to take evasive or retaliatory action as appropriate, embodiments of the invention provide on-screen graphical indicators, each of which indicates both the direction of the incoming attack and either the intensity of the incoming attack or a level of damage inflicted upon the player character as a consequence of the incoming attack. With regard to the concept of "level of damage inflicted upon the character", it will of course be appreciated that, in video games, a player character is usually able to receive a number of hits that progressively weaken the character before the character is killed or loses a life.

In more detail, and as shown for example in FIGS. 5-7 and FIGS. 8a-8c, a first (presently-preferred) embodiment of an on-screen graphical indicator 500 comprises a first pointing part 501 that is joined to an arc-shaped second part 502. The first pointing part 501 is arranged to indicate the direction of the incoming attack (the attack being illustrated by bullets 506 in FIGS. 5 and 6). The second part 502 is arranged to indicate the intensity of the incoming attack 506 or, alternatively, a level of damage inflicted upon the player character 504 as a consequence of the incoming attack 506.

Reference will now be made in passing to the procedural flow diagram in FIG. 18, which illustrates an attack analysing and graphical indicator generating routine 1800 according to embodiments of the invention. To generate the graphical indicator 500 during the course of the game the attack analysing unit 105/205 (as described above in relation to FIGS. 3 and 4) analyses 1801 the incoming attack 506 and determines 1802 the direction of the incoming attack. The concept of "direction of the incoming attack" will be explained in greater detail below.

The attack analysing unit 105/205 also determines 1803 the intensity of the incoming attack 506 or, alternatively, a level of damage inflicted upon the player character 504 as a consequence of the incoming attack 506. The alternative concepts of "intensity of the incoming attack" and "level of damage inflicted upon the player character as a consequence of the incoming attack" will also be explained in greater detail below. Depending on the setup of the game, the user may be able to choose (e.g. via a "preferences" menu) one of these two alternatives to be analysed and indicated by means of the graphical indicator. Alternatively, only one of these alternatives may be used in a particular game, as governed by the game software.

Using information provided by the attack analysing unit 105/205, the graphical indicator generating unit 113/213 then generates 1804 the on-screen graphical indicator 500 comprising the first pointing part 501 joined to the second part 502. More particularly, the graphical indicator generating unit 113/213 dynamically configures 1805 the angle of the first pointing part 501 (i.e. the angular direction on-screen in which the first pointing part 501 points) to indicate the determined direction of the incoming attack (i.e. as determined by the attack analysing unit 105/205).

The graphical indicator generating unit 113/213 also dynamically configures 1806 the second part 502 to indicate the intensity of the incoming attack 506 or, alternatively, the determined level of damage inflicted upon the player character 504 as a consequence of the incoming attack 506 (i.e. as determined by the attack analysing unit 105/205). Such configuration of the second part 502 may take a variety of forms, as explained in greater detail below. For instance, the second part 502 may change in length or size, or in some other visual manner (such as colour), to indicate the intensity of the incoming attack 506 or, alternatively, the determined level of damage inflicted upon the player character 504 as a consequence of the incoming attack 506.

The attack analysing process and the process of generating the graphical indicator 500 is carried out as a background routine within the overall game. In presently-preferred implementations the generation of the graphical indicator is continuous and dynamically adjusted whenever the player character is under attack. More particularly, the angle of the first part 501 and the configuration of the second part 502 are dynamically adjusted as the attack on the player character changes in direction and/or intensity, or as the level of damage inflicted upon the player character changes during the attack. Accordingly, the player is provided with an instantaneous representation of the attack they are under. Naturally, if the attack is continuous in its direction and/or intensity, the graphical indicator may maintain its configuration for the duration of the attack.

In alternative implementations the graphical indicator 500 may be generated only for short discrete moments during the gameplay, for example only at the start of an attack.

The Concept of "Direction of the Incoming Attack"

In many instances, an incoming attack may follow a linear trajectory from the enemy character to the player character. This is the case with gunfire, laser fire, etc. In such cases, the direction of the incoming attack is the direction of the enemy character from the player character.

However, in other cases, the direction of the incoming attack may be a direction of impact of the attack on the player character (and not necessarily the direction of the enemy character itself). This may be the case if the player character is under fire from projectiles such as arrows or stones that do not follow a linear trajectory.

To illustrate such a situation, FIG. 16 schematically depicts a screenshot 1600, from a "third person" perspective, of a player character 1604 (in this case bearing a sword 1605 and a shield) that is under attack from an enemy character 1607 (in this case an archer equipped with a bow 1608). As illustrated, the incoming attack 1606 is in the form of a launched projectile, namely an arrow from the archer, that follows a parabolic trajectory. Since the trajectory is non-linear, the direction of impact of the arrow on the player character 1604 will be different from the direction of the enemy character 1607 from the player character 1604. To convey this, the first pointing part 501 of the graphical indicator 500 indicates the direction of impact of the attack on the player character 1604, rather than the direction of the enemy character 1607 from the player character 1604. This may be helpful to the user as they may prefer to take action to evade or defend themselves from the incoming attack 1606, e.g. by moving the shield in accordance with the indicated direction of impact, to block the attack, rather than say attempting to shoot back at the enemy character 1607. Consequently, in such a situation, the graphical indicator 500 conveying the direction of impact of the attack 1606 on the player character 1604 may be more useful to the user than the direction of the enemy character 1607 itself.

The Concepts of "Intensity of the Incoming Attack" and "Level of Damage Inflicted Upon the Player Character as a Consequence of the Incoming Attack"

The concepts of "intensity of the incoming attack" and "level of damage inflicted upon the player character as a consequence of the incoming attack" may be embodied by, but not limited to, any of the following:

- the instantaneous intensity of the incoming attack (e.g. proportional to the number of incoming bullets or other projectiles fired at the player character per unit of time);
- the level of damage the attack is potentially capable of causing the player character (if defensive or retaliatory action is not taken);
- the instantaneous level of damage being absorbed by the player character (i.e. taking into account the effect of any shield or other defensive means possessed by the player character);
- the total level of damage absorbed by the player character over a period of gameplay (e.g. since the attack or battle began);
- the total level of damage absorbed by the player character since the beginning of the game.

Indicating Direction and Intensity

To describe the first embodiment of the invention in more detail, and to exemplify some of the principles introduced above, reference will now be made to FIGS. 5-7 and FIGS. 8a-8c, which all depict an on-screen graphical indicator 500 in which the second part 502 is arc-shaped. Reference will also be made to FIG. 17, which is an annotated and simplified version of FIG. 5, to illustrate geometrical aspects of the graphical indicator 500.

Figure 6:
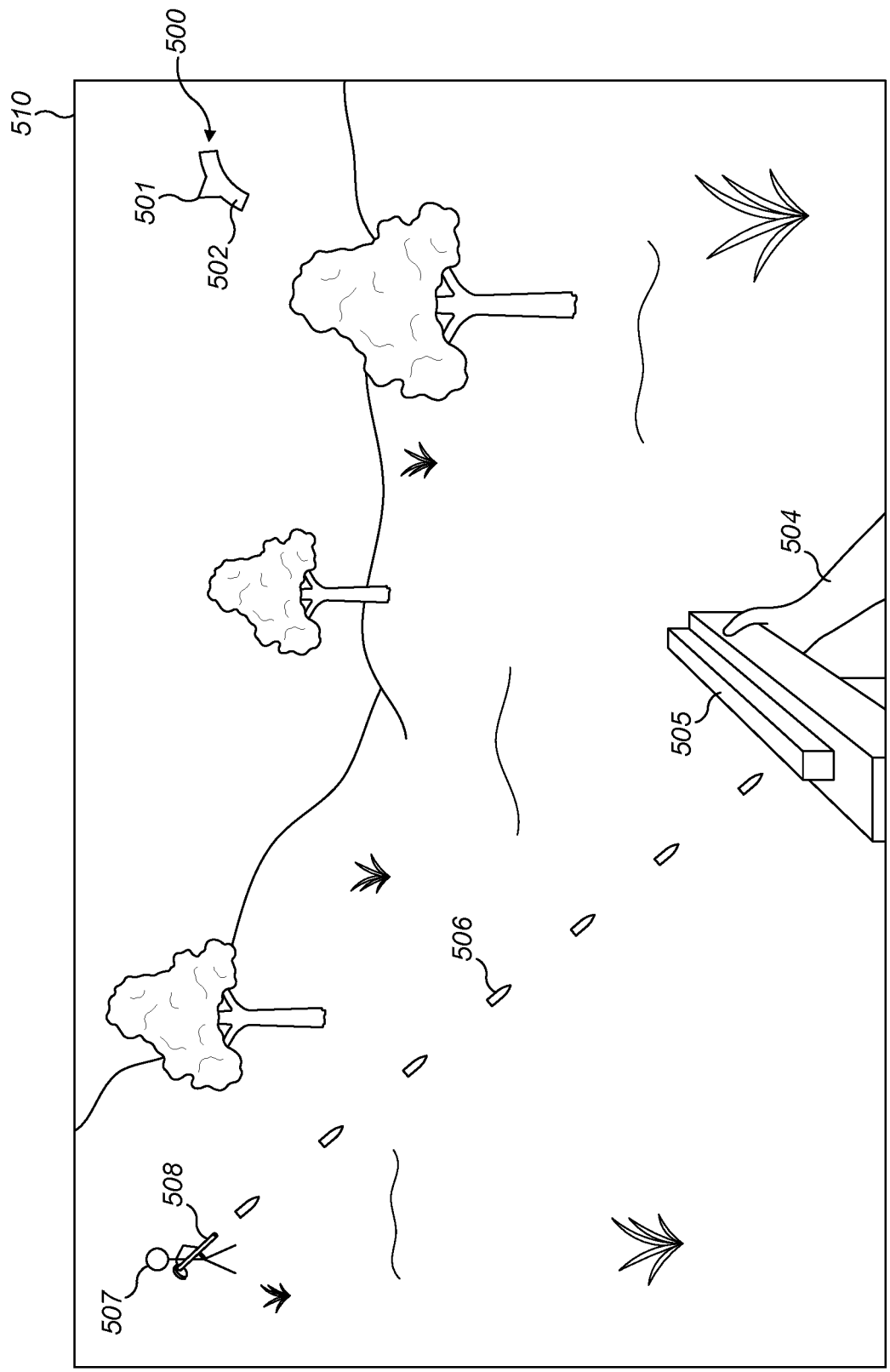
FIG. 6 schematically depicts a screenshot similar to that of FIG. 5, but with the player character receiving an incoming attack of a relatively low intensity from an enemy character positioned on-screen in front and to the left of the player character, and including the graphical indicator in accordance with the first embodiment.
Figure 7:
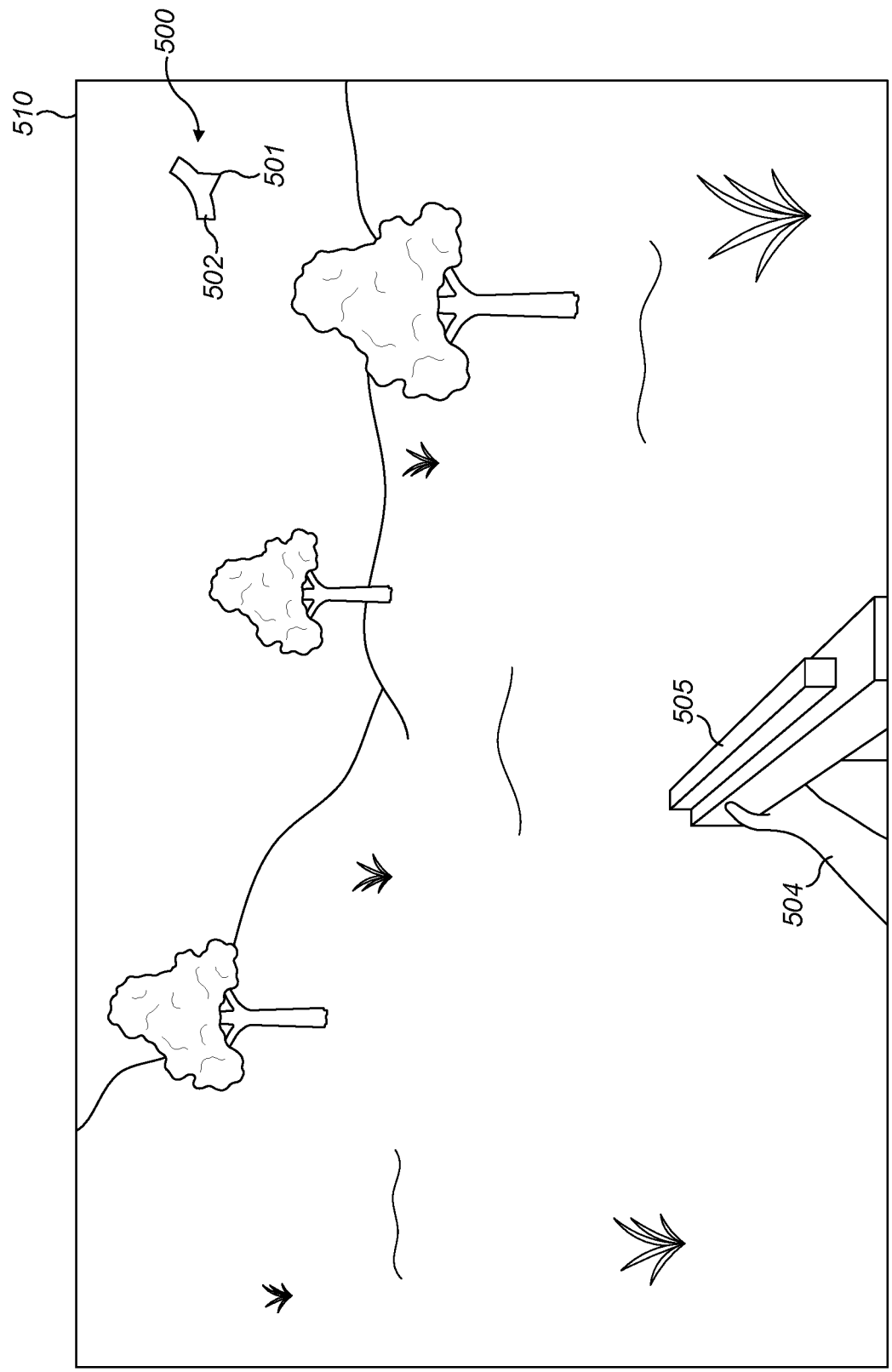
FIG. 7 schematically depicts a screenshot similar to that of FIGS. 5 and 6, but with the player character receiving an incoming attack of a relatively low intensity from an enemy character positioned off-screen, behind and to the right of the player character, and including the graphical indicator in accordance with the first embodiment.

More particularly, FIGS. 5-7 depict a series of schematic screenshots 510 of various scenes in a virtual world of a "first-person shooter" video game in which the player character 504 is carrying a gun 505. In practice, such video screens may be generated by the image generator 111/211 and virtual camera control unit 112/212, under the control of processor 104/204 (see FIGS. 3 and 4). It will of course be appreciated that, in the present FIGS. 5-7, black and white line drawings are used to represent what would typically be displayed to the user as rendered video (preferably photo-realistic video rendering) in the game.

In the depicted screenshots 510, the player character 504 is under attack by an enemy character 507 who is carrying a gun 508. Thus, the attack to which the player character 504 is subjected is gunfire—i.e. a stream of bullets 506 fired by the enemy character 507 towards the player character.

The on-screen graphical indicator 500 comprises two conjoined parts: a first pointing part 501 and a second part 502. In the illustrated embodiment the first pointing part 501 comprises an arrowhead and is arranged to indicate the determined direction of the incoming attack 506, whereas the second part 502 comprises an arc and is configured to indicate, by means of the length of the arc, the determined intensity of the incoming attack 506 or the determined level of damage inflicted upon the player character 504 as a consequence of the incoming attack.

To indicate the determined direction of the incoming attack 506, and with reference to the annotated and simplified diagram in FIG. 17, the graphical indicator generating unit 113/213 is configured to adjustably set the angular position 1714 of the first pointing part 501 relative to a reference position 1712 which corresponds to a straight-ahead direction 1711 of the player character 504. In such a manner, the angular position 1714 of the first pointing part 501, at an angle $\theta$ from the reference position 1712, corresponds to the direction 1713 of the incoming attack 506 relative to the straight-ahead direction 1711 of the player character 504, at the same angle $\theta$.

In the illustrated embodiment the arc of the second part 502 is an arc of a virtual circle, with the first pointing part 501 pointing outward from the midpoint of the arc. The graphical indicator generating unit 113/213 is configured to adjustably set the angular position of the first pointing part 501 on the circumference of the virtual circle, according to the determined direction of the incoming attack 506, with the arc-shaped second part 502 extending on both sides of the first pointing part 501, also on the circumference of the virtual circle. The centre of the virtual circle is indicated by "O" in FIG. 17, which also corresponds to the point of intersection of the virtual lines denoting the reference position 1712 and the angular position 1714 of the first pointing part 501.

In the illustrated embodiment the arrowhead 501 points outward from the outer (convex) face of the arc 502. However, in alternative embodiments, the arrowhead 501 may point inwards from the inner (concave) face of the arc 502, in an equivalent angular position.

The graphical indicator generating unit 113/213 is configured to adjustably set the length of the arc 502 in dependence on the determined intensity of the incoming attack or the determined level of damage inflicted upon the player character 504 as a consequence of the incoming attack.

In the instance of gameplay shown in FIG. 5 the incoming attack 506 is of a relatively high intensity (denoted by the relatively high frequency of bullets in the illustration) and is originating from an off-screen enemy character 507. That is to say, the enemy character 507 is not visible to the user at this moment in the game, and is illustrated outside the screenshot 510 in FIG. 5 merely for the sake of explanation. The enemy character 507 is located in a direction in front of the player character 504 and to the right of the direction the player character is facing.

Accordingly, in this instance the arrowhead 501 of the graphical indicator 500 is pointed upwards and to the right, to indicate the direction of the incoming attack 506, and the arc 502 is relatively long to indicate the relatively high intensity of the incoming attack 506.

Although the bullets of the incoming attack 506 are shown in this schematic screenshot for reference, in the actual gameplay they may not be visible to the user. The indicator 500 may therefore be the only indication to the player of the direction and intensity of the attack the player character is under.

FIG. 6 shows a further instance of the video game, in which the player character 504 is in receipt of an incoming attack 506 of a relatively low intensity (denoted by the relatively low frequency of bullets in the illustration). The attack 506 of gunfire is incident on the player character 504 from a direction in front of and to the left of the player character 504. This is shown by the graphical indicator 500, in which the arrowhead 501 is directed upwards and to the left, and the length of the arc 502 is relatively short, to indicate the relatively low intensity of the incoming attack 506.

It should be noted that, in FIG. 6, the graphical indicator 500 is in a different position on the screen than in FIG. 5. Indeed, the graphical indicator generating unit 113/213 may be configured to reposition the graphical indicator within the screen, so as not to obscure relevant content (such as the enemy character 507 in FIG. 6).

In FIG. 7 the incoming attack (not shown) is coming from behind and to the right of the player character 504, and is of a relatively low intensity. This is shown by the graphical indicator 500, in which the arrowhead 501 is directed downwards and to the right, and the length of the arc 502 is relatively short, to indicate the relatively low intensity of the incoming attack.

As can be appreciated from FIG. 7 in particular, the graphical indicator 500 may be the only indication that the user may have that the player character 504 is under attack—thus illustrating the usefulness of the graphical indicator 500 to the user.

FIGS. 8a, 8b and 8c show three instances of the graphical indicator 500 of the first embodiment, as employed in FIGS. 5-7, i.e. wherein the second part 502 comprises an arc (on the circumference of a virtual circle) and the first pointing part 501 comprises an arrowhead arranged in the midpoint of the arc 502.

As noted above, the graphical indicator generating unit 113/213 is configured to adjustably set the length or size of the arc 502 in dependence on the determined intensity of the incoming attack or the determined level of damage inflicted upon the player character as a consequence of the incoming attack. In this embodiment, a larger or longer arc 502 indicates a greater intensity of attack or level of damage.

To illustrate this, FIGS. 8a to 8c represent three different levels of intensity of an incoming attack. FIG. 8a represents a relatively low intensity of an incoming attack, denoted by a relatively short length of the arc 502; FIG. 8b represents a medium intensity of an incoming attack, denoted by an intermediate length of the arc 502; and FIG. 8c represents a relatively high intensity of an incoming attack, denoted by a relatively long length of the arc 502. Naturally, as explained above, in practice the graphical indicator 500 would be dynamically rotated as appropriate, so that the angular position of the first pointing part 501 indicates the direction of the incoming attack.

As discussed above, in the embodiment of FIGS. 5-7 and 8a-8c the second part 502 of the graphical indicator 500 comprises an arc of a virtual circle. Alternatively, in other embodiments, the arc may be an arc of another curved virtual shape, such a virtual ellipse.

In further alternative embodiments the second part of the graphical indicator may comprise some other geometric shape or may take some other form, some examples of which will now be described. In all these cases, in practice the graphical indicator would be dynamically rotated as appropriate, so that the angular position of the first pointing part indicates the direction of the incoming attack.

Perpendicular Line Indicator

FIGS. 9a, 9b and 9c illustrate a second embodiment of a graphical indicator 900 having a first pointing part 901 joined to a second part 902. The second part 902 is elongate, in the form of a line or bar arranged substantially perpendicularly to the pointing direction of the first pointing part 901. In this embodiment the first pointing part 901 is also an arrowhead and is located at the midpoint of the perpendicular line 902.

Similar to the first embodiment, the graphical indicator generating unit 113/213 is configured to adjustably set the length or size of the second part 902 in dependence on the determined intensity of the incoming attack or the determined level of damage inflicted upon the player character as a consequence of the incoming attack. In this embodiment, a larger or longer line 902 indicates a greater intensity of attack or level of damage.

To illustrate this, FIGS. 9a to 9c represent three different levels of intensity of an incoming attack. FIG. 9a represents a relatively low intensity of an incoming attack, denoted by a relatively short length of the line 902; FIG. 9b represents a medium intensity of an incoming attack, denoted by an intermediate length of the line 902; and FIG. 9c represents a relatively high intensity of an incoming attack, denoted by a relatively long length of the line 902.

Parallel Line Indicator

FIGS. 10a, 10b and 10c illustrate a third embodiment of a graphical indicator 1000 having a first pointing part 1001 joined to a second part 1002. The second part 1002 is elongate, in the form of a line or bar arranged substantially parallel to the pointing direction of the first pointing part 1001. In this embodiment the first pointing part 1001 is an arrowhead and is located at one end of the second part 1002.

Similar to the first and second embodiments, the graphical indicator generating unit 113/213 is configured to adjustably set the length or size of the second part 1002 in dependence on the determined intensity of the incoming attack or the determined level of damage inflicted upon the player character as a consequence of the incoming attack. In this embodiment, a larger or longer line 1002 indicates a greater intensity of attack or level of damage.

To illustrate this, FIGS. 10a to 10c represent three different levels of intensity of an incoming attack. FIG. 10a represents a relatively low intensity of an incoming attack, denoted by a relatively short length of the line 1002; FIG. 10b represents a medium intensity of an incoming attack, denoted by an intermediate length of the line 1002; and FIG. 10c represents a relatively high intensity of an incoming attack, denoted by a relatively long length of the line 1002.

Segmented Line Indicator

The second part of the line-based graphical indicators of FIGS. 8a-8c, 9a-9c and 10a-10c may be graphically divided into segments or provided with other graduations, to give the user an even more quantitative appreciation of the intensity of the incoming attack or the level of damage inflicted upon the player character as a consequence of the incoming attack.

By way of example, FIGS. 11a, 11b and 11c illustrate a fourth embodiment of a graphical indicator 1100 having a first pointing part 1101 joined to a second part 1102, that is a segmented version of the indicator 1000 of FIGS. 10*a*, 10*b* and 10*c*. Thus, the second part 1102 of the indicator 1100 is in the form of a segmented line or bar arranged substantially parallel to the pointing direction of the first pointing part 1101.

Similar to the preceding embodiments, the graphical indicator generating unit 113/213 is configured to adjustably set the length or size of the second part 1102 in dependence on the determined intensity of the incoming attack or the determined level of damage inflicted upon the player character as a consequence of the incoming attack. In this embodiment, a larger or longer line 1102 indicates a greater intensity of attack or level of damage.

To illustrate this, FIGS. 11*a* to 11*c* represent three different levels of intensity of an incoming attack. FIG. 11*a* represents a relatively low intensity of an incoming attack, denoted by a relatively short length (i.e. a single segment) of the segmented line 1102; FIG. 11*b* represents a medium intensity of an incoming attack, denoted by an intermediate length (two segments) of the line 1102; and FIG. 11*c* represents a relatively high intensity of an incoming attack, denoted by a relatively long length (three segments) of the line 1102.

Shaded Indicator

Figure 12A:
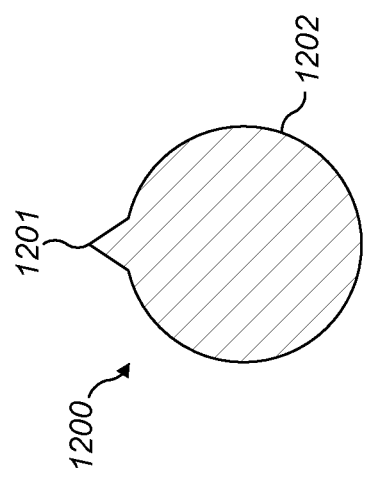
FIGS. 12a, 12b and 12c depict a graphical indicator according to a fifth embodiment, the indicator indicating, respectively, a low intensity of an incoming attack (FIG. 12a), a medium intensity of an incoming attack (FIG. 12b), and a high intensity of an incoming attack (FIG. 12c), as well as the direction of the incoming attack.
Figure 12B:
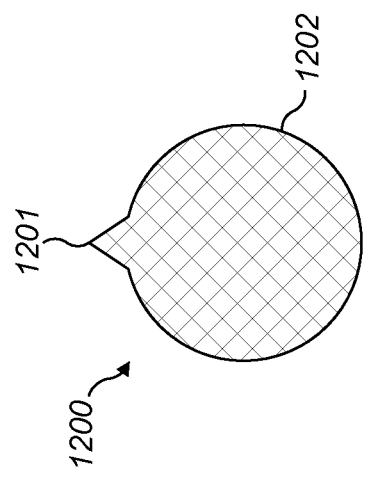
Figure 12C:
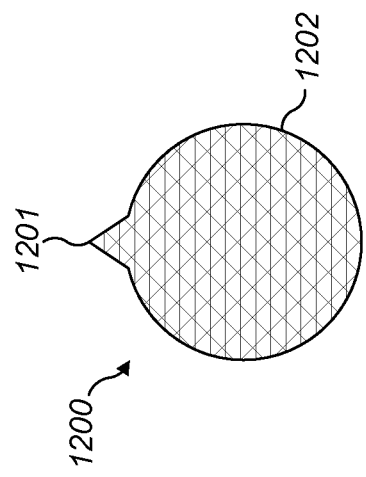

FIGS. 12*a*, 12*b* and 12*c* show a fifth embodiment of a graphical indicator 1200 having a first pointing part 1201 joined to a second part 1202. The second part 1202 is substantially circular (although it could be any other shape) and is provided with shading. The first pointing part 1201 is again an arrowhead.

In this case, the graphical indicator generating unit 113/213 is configured to adjustably set the density of shading of the second part 1202 in dependence on the determined intensity of the incoming attack or the determined level of damage inflicted upon the player character as a consequence of the incoming attack. In this embodiment, a higher density of shading of the second part 1202 indicates a greater intensity of attack or level of damage.

To illustrate this, FIGS. 12*a* to 12*c* represent three different levels of intensity of an incoming attack. FIG. 12*a* represents a relatively low intensity of an incoming attack, denoted by a relatively low density of shading of the second part 1202; FIG. 12*b* represents a medium intensity of an incoming attack, denoted by an intermediate density of shading of the second part 1202; and FIG. 12*c* represents a relatively high intensity of an incoming attack, denoted by a relatively high density of shading of the second part 1202.

Filled Indicator

Figure 13A:
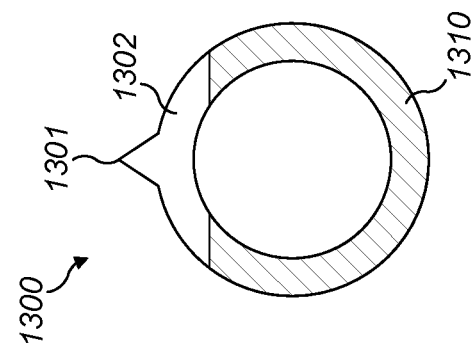
FIGS. 13a, 13b and 13c depict a graphical indicator according to a sixth embodiment, the indicator indicating, respectively, a low intensity of an incoming attack (FIG. 13a), a medium intensity of an incoming attack (FIG. 13b), and a high intensity of an incoming attack (FIG. 13c), as well as the direction of the incoming attack.
Figure 13B:
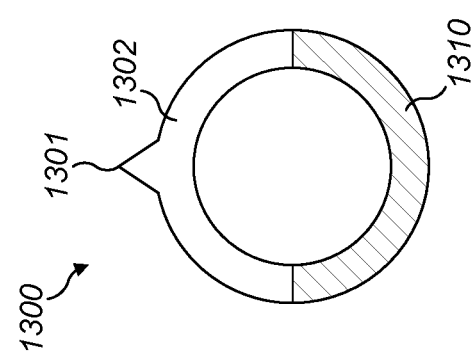
Figure 13C:
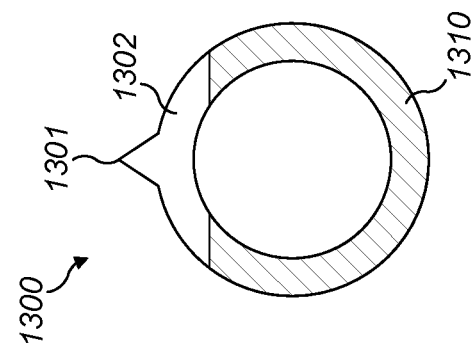

FIGS. 13*a*, 13*b* and 13*c* show a sixth embodiment of a graphical indicator 1300 having a first pointing part 1301 joined to a second part 1302. The second part 1302 is substantially circular (although it could be any other shape) and is provided with at least partial shading or fill 1310. The first pointing part 1301 is again an arrowhead.

In this case, the graphical indicator generating unit 113/213 is configured to adjustably set the extent of shading or fill 1310 of the second part 1302 in dependence on the determined intensity of the incoming attack or the determined level of damage inflicted upon the character as a consequence of the incoming attack. In this embodiment, a greater extent of shading or fill 1310 of the second part 1302 indicates a greater intensity of attack or level of damage.

To illustrate this, FIGS. 13*a* to 13*c* represent three different levels of intensity of an incoming attack. FIG. 13*a* represents a relatively low intensity of an incoming attack, denoted by a relatively low extent of shading or fill 1310 of the second part 1302; FIG. 13*b* represents a medium intensity of an incoming attack, denoted by an intermediate extent of shading or fill 1310 of the second part 1302; and FIG. 13*c* represents a relatively high intensity of an incoming attack, denoted by a relatively high extent of shading or fill 1310 of the second part 1302.

In a variant which is not shown in the figures, the second part of the graphical indicator (which may be any shape) may change colour. In such a case, the graphical indicator generating unit 113/213 is configured to adjustably set the colour of the second part in dependence on the determined intensity of the incoming attack or the determined level of damage inflicted upon the player character as a consequence of the incoming attack. For instance, a green colour may indicate a low intensity of attack or a low level of damage, a yellow colour may indicate a medium intensity of attack or a medium level of damage, and a red colour may indicate a high intensity of attack or a high level of damage. The second part of the graphical indicator is joined to a first pointing part as per the earlier embodiments.

Numerical Indicator

FIGS. 14*a*, 14*b* and 14*c* show a seventh embodiment of a graphical indicator 1400 having a first pointing part 1401 joined to a second part 1402. The second part 1402 comprises a numerical indicator which includes a numerical value (in this case ranging from 1 to 10). The first pointing part 1401 is again an arrowhead.

In this case, the graphical indicator generating unit 113/213 is configured to adjustably set the numerical value of the numerical indicator in dependence on the determined intensity of the incoming attack or the determined level of damage inflicted upon the player character as a consequence of the incoming attack.

To illustrate this, FIGS. 14*a* to 14*c* represent three different levels of intensity of an incoming attack. FIG. 14*a* represents a relatively low intensity of an incoming attack, denoted by a relatively low numerical value (1) in the second part 1402; FIG. 14*b* represents a medium intensity of an incoming attack, denoted by an intermediate numerical value (6) in the second part 1402; and FIG. 14*c* represents a relatively high intensity of an incoming attack, denoted by a relatively high numerical value (9) in the second part 1402.

Graphical Image Indicator

FIGS. 15*a*, 15*b* and 15*c* show an eighth embodiment of a graphical indicator 1500 having a first pointing part 1501 joined to a second part 1502. The overall graphical indicator 1500 is a graphical image (in this case an archer's arrow), the extent of completeness of which indicates the intensity of the incoming attack or the determined level of damage inflicted upon the player character as a consequence of the incoming attack. The extent of completeness of the indicator 1500 is thus variable—especially, but not necessarily exclusively, in terms of the appearance of the second part 1502. The first pointing part 1501 is again an arrowhead.

In this case, the graphical indicator generating unit 113/213 is configured to adjustably set the extent of completeness of the graphical image in dependence on the determined intensity of the incoming attack or the determined level of damage inflicted upon the player character as a consequence of the incoming attack.

To illustrate this, FIGS. 15*a* to 15*c* represent three different levels of intensity of an incoming attack. FIG. 15*a* represents a relatively low intensity of an incoming attack, denoted by a relatively low extent of completeness of the second part 1502 (the absence of fletches); FIG. 15*b* represents a medium intensity of an incoming attack, denoted by an intermediate extent of completeness of the second part 1502 (only a few fletches are shown); and FIG. 15*c* represents a relatively high intensity of an incoming attack, denoted by a relatively high extent of completeness of the second part 1502 (a full complement of fletches is shown).

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

The invention claimed is:

1. A computer-readable recording medium including a program which is executed by a computer apparatus to provide a video game that is progressed by controlling a character operated by a player in a virtual game world in which the character is vulnerable to attack, the program causing the computer apparatus to function as:
an attack analysing unit configured to:
determine a direction of an incoming attack as a direction of impact of the attack on the character when the character is under the attack by a projectile that do not follow a linear trajectory, and
determine an intensity of the incoming attack or a level of damage inflicted upon the character as a consequence of the incoming attack; and
a graphical indicator generating unit configured to generate an on-screen graphical indicator comprising:
a first pointing part arranged to indicate the determined direction of the incoming attack, and
a second part arranged to indicate the determined intensity of the incoming attack or the determined level of damage inflicted upon the character as a consequence of the incoming attack;
wherein the first pointing part and the second part are joined together to form the graphical indicator;
wherein the graphical indicator generating unit is configured to adjustably set a dimension or a characteristic of the second part in dependence on the determined intensity of the incoming attack or the determined level of damage inflicted upon the character as a consequence of the incoming attack;
wherein the graphical indicator generating unit is further configured to determine a location of the on-screen graphical indicator based on content to be displayed on a screen; and
wherein the location of the on-screen graphical indicator is determined by the graphical indicator generating unit to prevent obscuring of a source of the attack by the on-screen graphical indicator on the screen.

2. The computer-readable recording medium according to claim 1, wherein the first pointing part comprises an arrowhead.

3. The computer-readable recording medium according to claim 1, wherein the graphical indicator generating unit is configured to adjustably set an angular position of the first pointing part relative to a reference position which corresponds to a straight-ahead direction of the character, the angular position of the first pointing part corresponding to the direction of the incoming attack relative to the straight-ahead direction of the character.

4. The computer-readable recording medium according to claim 3, wherein the second part comprises an arc, wherein the arc is an arc of a virtual circle, and wherein the graphical indicator generating unit is configured to adjustably set the angular position of the first pointing part on the circumference of the virtual circle.

5. The computer-readable recording medium according to claim 1, wherein the second part comprises a geometric shape.

6. The computer-readable recording medium according to claim 5, wherein the second part comprises an arc.

7. The computer-readable recording medium according to claim 6, wherein the first pointing part is arranged in the midpoint of the arc.

8. The computer-readable recording medium according to claim 1, wherein the graphical indicator generating unit is configured to arrange the second part substantially perpendicularly to the pointing direction of the first pointing part.

9. The computer-readable recording medium according to claim 1, wherein the characteristic of the second part is a density of shading of the second part in dependence on the determined intensity of the incoming attack or the determined level of damage inflicted upon the character as a consequence of the incoming attack or fill of the second part in dependence on the determined intensity of the incoming attack or the determined level of damage inflicted upon the character as a consequence of the incoming attack.

10. The computer-readable recording medium according to claim 1, wherein the characteristic of the second part is a colour of the second part in dependence on the determined intensity of the incoming attack or the determined level of damage inflicted upon the character as a consequence of the incoming attack.

11. The computer-readable recording medium according to claim 1, wherein the characteristic of the second part is a numerical value of the numerical indicator in the second part, the numerical value in dependence on the determined intensity of the incoming attack or the determined level of damage inflicted upon the character as a consequence of the incoming attack.

12. The computer-readable recording medium according to claim 1, wherein the characteristic of the second part is an extent of completeness of the graphical image in dependence on the determined intensity of the incoming attack or the determined level of damage inflicted upon the character as a consequence of the incoming attack.

13. The computer-readable recording medium according to claim 1, wherein the direction of the incoming attack is a direction of impact of the attack on the character.

14. The computer-readable recording medium according to claim 1, wherein the attack analysing unit is configured to determine an instantaneous intensity of the incoming attack.

15. The computer-readable recording medium according to claim 1, wherein the attack analysing unit is configured to determine the level of damage the attack is capable of causing the character.

16. The computer-readable recording medium according to claim 1, wherein the attack analysing unit is configured to determine the instantaneous level of damage being absorbed by the character.

17. The computer-readable recording medium according to claim 1, wherein the attack analysing unit is configured to determine the total level of damage absorbed by the character over a period of gameplay.

18. The computer-readable recording medium according to claim 1, wherein the first pointing part has a length along a longitudinal direction parallel to a direction in which the incoming attack travels and a width perpendicular to the longitudinal direction, and wherein the second part is elongate in the longitudinal direction, and wherein the adjustable dimension of the second part is in the longitudinal direction.

* * * * *